US012770359B2

(12) United States Patent
Lee

(10) Patent No.: US 12,770,359 B2
(45) Date of Patent: Oct. 20, 2026

(54) INFORMATION PROCESSING APPARATUS, INFORMATION PROCESSING METHOD, AND RECORDING MEDIUM

(71) Applicant: NEC Corporation, Tokyo (JP)

(72) Inventor: Kapik Lee, Tokyo (JP)

(73) Assignee: NEC CORPORATION, Tokyo (JP)

( * ) Notice: Subject to any disclaimer, the term of this patent is extended or adjusted under 35 U.S.C. 154(b) by 515 days.

(21) Appl. No.: 18/272,563

(22) PCT Filed: Apr. 12, 2021

(86) PCT No.: PCT/JP2021/015184
§ 371 (c)(1),
(2) Date: Jul. 14, 2023

(87) PCT Pub. No.: WO2022/219680
PCT Pub. Date: Oct. 20, 2022

(65) Prior Publication Data

US 2024/0071043 A1 Feb. 29, 2024

(51) Int. Cl.
*G06V 10/60* (2022.01)
*G06V 10/141* (2022.01)

(52) U.S. Cl.
CPC ............ *G06V 10/60* (2022.01); *G06V 10/141* (2022.01)

(58) Field of Classification Search
None
See application file for complete search history.

(56) References Cited

U.S. PATENT DOCUMENTS

| | | | |
|---|---|---|---|
| 2003/0174868 | A1 | 9/2003 | Adachi et al. |
| 2006/0210261 | A1 | 9/2006 | Kakiuchi et al. |
| 2012/0027292 | A1 | 2/2012 | Kosakaya et al. |

(Continued)

FOREIGN PATENT DOCUMENTS

| | | | |
|---|---|---|---|
| JP | H11-339048 | A | 12/1999 |
| JP | 2003-242491 | A | 8/2003 |

(Continued)

OTHER PUBLICATIONS

Gibson, A., "Setting the Mean"—snibgo's ImageMagick pp. 2016. (Year: 2016).*

(Continued)

*Primary Examiner* — Chan S Park
*Assistant Examiner* — Promotto Tajrian Islam
(74) *Attorney, Agent, or Firm* — Sughrue Mion, PLLC

(57) ABSTRACT

An information processing apparatus includes: an acquisition unit that obtains a plurality of person images which are generated by imaging a target by using a plurality of different lighting conditions, respectively; a correction unit that performs a correction process of correcting a luminance value of at least one of the plurality of person images, by using at least one of a first index value indicating a mean of a luminance value of at least one of the plurality of person images, and a second index value indicating a degree of variation in the luminance value of the at least one of the plurality of person images; and a determination unit that determines whether or not the target pretends to be another person, on the basis of the person image in which the luminance value is corrected.

7 Claims, 4 Drawing Sheets

(56) References Cited

U.S. PATENT DOCUMENTS

| | | | | |
|---|---|---|---|---|
| 2015/0310259 | A1* | 10/2015 | Lau | G06V 40/169 382/118 |
| 2015/0324629 | A1 | 11/2015 | Kim et al. | |
| 2019/0050659 | A1* | 2/2019 | Hwang | G06F 17/18 |
| 2020/0349372 | A1* | 11/2020 | Lee | G06V 40/171 |
| 2021/0034894 | A1* | 2/2021 | Ebihara | G06V 40/197 |
| 2023/0085605 | A1* | 3/2023 | Zhang | G06T 11/00 345/589 |

FOREIGN PATENT DOCUMENTS

| | | | |
|---|---|---|---|
| JP | 2005-135271 | A | 5/2005 |
| JP | 2006-259923 | A | 9/2006 |
| JP | 2007-072861 | A | 3/2007 |
| JP | 2010-231398 | A | 10/2010 |
| JP | 2014-219703 | A | 11/2014 |
| JP | 2015-215876 | A | 12/2015 |
| WO | 2019/163066 | A1 | 8/2019 |

OTHER PUBLICATIONS

Larin et al., “Research and Comparison of Facial Color Normalization Methods Relative to an Etalon Image”, Publication Year: 2025 (Year: 2025).*

Histomics TK—reinhard.py (https://github.com/DigitalSlideArchive/HistomicsTK/blob/5c762ed9b8ae414659faf161db3e32aea6810c37/histomicstk/preprocessing/color_normalization/reinhard.py) (Year: 2019).*

Extended European Search Report for EP Application No. 21936884.2, dated on Apr. 8, 2024.

Jason Brownlee, “How to Normalize, Center, and Standardize Image Pixels in Keras”, Jul. 5, 2019, pp. 1-16, XP093144559, Retrieved from the Internet: URL: https://machinelearningmastery.com/how-to-normalize-center-and-standardize-images-with-the-imagedatagenerator-in-keras/ [retrieved on Mar. 22, 2024].

International Search Report for PCT Application No. PCT/JP2021/015184, mailed on Jul. 6, 2021.

* cited by examiner

INFORMATION PROCESSING APPARATUS, INFORMATION PROCESSING METHOD, AND RECORDING MEDIUM

This application is a National Stage Entry of PCT/JP2021/015184 filed on Apr. 12, 2021, the contents of all of which are incorporated herein by reference, in their entirety.

TECHNICAL FIELD

This disclosure relates to technical fields of an information processing apparatus, an information processing method, and a recording medium that are configured to determine whether or not a target who is in a person image pretends to be another person, for example.

BACKGROUND ART

Patent Literature 1 describes an example of the information processing apparatus that is configured to determine whether or not a target who is in a person image is another person. Patent Literature 1 describes an information processing apparatus that calculates a feature quantity, which reflects a three-dimensional shape of a face of the target and which does not depend on the color of a surface of the face of the target on the basis of a luminance value of a face part in a first image frame including the face of the target when light is emitted by a light emitting apparatus, and a luminance value of the face part in a second image frame including the face of the target when the light emitting apparatus is turned off, and that determines whether or not the target is pretending on the basis of the calculated feature quantity.

In addition, as background art documents related to this disclosure, Patent Literatures 2 to 5 are cited.

CITATION LIST

Patent Literature

Patent Literature 1: International Publication No. WO2019/163066 pamphlet
Patent Literature 2: JP2015-215876A
Patent Literature 3: JP2010-231398A
Patent Literature 4: JP2007-072861A
Patent Literature 5: JP2005-135271A
Patent Literature 6: JP2003-242491A

SUMMARY

Technical Problem

It is an example object of this disclosure to provide an information processing apparatus, an information processing method, and a recording medium that aim to improve the techniques/technologies described in Citation List.

Solution to Problem

An information processing apparatus according to an example aspect of this disclosure includes: an acquisition unit that obtains a plurality of person images which are generated by imaging a target by using a plurality of different lighting conditions, respectively; a correction unit that performs a correction process of correcting a luminance value of at least one of the plurality of person images, by using at least one of a first index value indicating a mean of a luminance value of at least one of the plurality of person images, and a second index value indicating a degree of variation in the luminance value of the at least one of the plurality of person images; and a determination unit that determines whether or not the target pretends to be another person, on the basis of the person image in which the luminance value is corrected.

An information processing method according to an example aspect of this disclosure includes: obtaining a plurality of person images which are generated by imaging a target by using a plurality of different lighting conditions, respectively; performing a correction process of correcting a luminance value of at least one of the plurality of person images, by using at least one of a first index value indicating a mean of a luminance value of at least one of the plurality of person images, and a second index value indicating a degree of variation in the luminance value of the at least one of the plurality of person images; and determining whether or not the target pretends to be another person, on the basis of the person image in which the luminance value is corrected.

A recording medium according to an example aspect of this disclosure is a recording medium on which a computer program that allows a computer to execute an information processing method is recorded, the information processing method including: obtaining a plurality of person images which are generated by imaging a target by using a plurality of different lighting conditions, respectively; performing a correction process of correcting a luminance value of at least one of the plurality of person images, by using at least one of a first index value indicating a mean of a luminance value of at least one of the plurality of person images, and a second index value indicating a degree of variation in the luminance value of the at least one of the plurality of person images; and determining whether or not the target pretends to be another person, on the basis of the person image in which the luminance value is corrected.

DESCRIPTION OF EXAMPLE EMBODIMENT

Hereinafter, an information processing apparatus, an information processing method, and a recording medium according to an example embodiment will be described. The following describes the information processing apparatus, the information processing method, and the recording medium according to the example embodiment by using an information processing system SYS to which the information processing apparatus, the information processing method, and the recording medium according to the example embodiment are applied.

(1) Configuration of Information Processing System SYS

First, a configuration of the information processing system SYS according to the example embodiment will be described.

(1-1) Overall Structure of Information Processing System SYS

Figure 1:
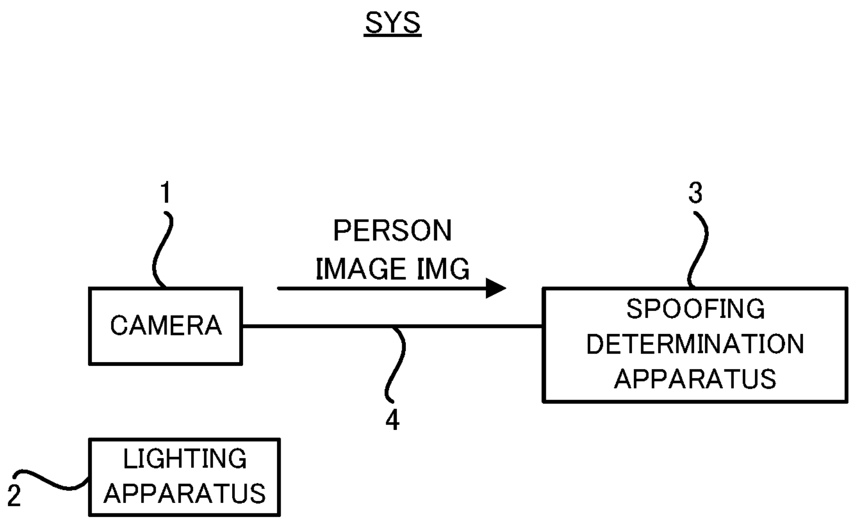
FIG. 1 is a block diagram illustrating an overall configuration of an information processing system according to an example embodiment.

First, an overall configuration of the information processing system SYS in the example embodiment will be described with reference to FIG. 1. FIG. 1 is a block diagram illustrating the overall configuration of the information processing system SYS according to the example embodiment.

As illustrated in FIG. 1, the information processing system SYS includes a camera 1, a lighting apparatus 2, and an information processing apparatus 3. The information processing system SYS may include a single camera 1 or may include a plurality of cameras 1. When the information processing system SYS includes a plurality of cameras 1, the information processing system SYS may include a plurality of lighting apparatuses 2 respectively corresponding to the plurality of cameras 1. The camera 1 and the information processing apparatus 3 are communicable with each other through a communication network 4. The communication network 4 may include a wired communication network. The communication network 4 may include a wireless communication network.

The camera 1 is an imaging apparatus that is configured to image a target (i.e., a person) located in an imaging target range of the camera 1. The camera 1 images the target, thereby to generate a person image IMG including the target imaged by the camera 1. In particular, the camera 1 images a face of the target, thereby to generate the person image IMG including the face of the person. The generated person image IMG is outputted to the information processing apparatus 3. Specifically, the camera 1 transmits the generated person image IMG to the information processing apparatus 3 through the communication network 4.

The lighting apparatus 2 is configured to illuminate the target with an illumination light. The lighting apparatus 2 is configured to change a lighting condition. The lighting condition may include, for example, a condition about the presence or absence of emission of the illumination light. The lighting condition may include the intensity of the illumination light. The lighting condition may include an lighting direction of the illumination light (i.e., a direction in which the illumination light is applied to the target, and a direction of an emission source of the illumination light as viewed from the target).

The illumination light may include a light emitted to illuminate the target. In this case, a light, a light bulb or the like that emits a light to illuminate the target may be used as the lighting apparatus 2. Alternatively, in addition to or in place of the light emitted to illuminate the target, the illumination light may include a light emitted for a different purpose from the purpose of illuminating the target. For example, a display emits a light to display an image (wherein the image may mean at least one of a still image and a video), but the light emitted by the display may be used as the illumination light that illuminates the target. In this case, a display of a smartphone or a tablet terminal owned by the target may be used as the lighting apparatus 2.

When the display is used as the lighting apparatus 2, the lighting condition (especially, a condition about the presence or absence of emission of the illumination light) may include a condition about on/off of the display. The lighting condition (especially, a condition about the intensity of the illumination light) may include a condition about the brightness (i.e., luminance) of a display surface of the display. The lighting condition (especially, a condition about the intensity of the illumination light) may include a condition about a change in the brightness (i.e., luminance) of the display surface of the display. The lighting condition may include a condition about a color of the display surface of the display. The lighting condition may include a condition about a change in the color of the display surface of the display.

The lighting condition may include a condition about a display aspect of each display area when the display surface of the display is divided into a plurality of display areas. The display aspect of the display area may include the brightness (i.e., luminance) of the display area and the color of the display area. The display aspect of the display area may include at least one of the change in the brightness (i.e., luminance) of the display area and the change in the color of the display area. The lighting condition may be set such that the display aspects of the plurality of display areas are all the same. Alternatively, the illumination may be set such that at least of two display aspects of the plurality of display areas are differ from each other. As an example, the lighting apparatus 2 may change the lighting condition such that the plurality of display areas display predetermined colors in a predetermined order. As another example, the lighting apparatus 2 may change the lighting condition such that the plurality of display areas display screens of predetermined colors in a random order. As another example, the lighting apparatus 2 may change the lighting condition such that at least one color of the plurality of display areas changes in accordance with a predetermined color order. As another example, the lighting apparatus 2 may change the lighting condition such that at least one color of the plurality of display areas changes in a random color order. At this time, a duration in which each display area displays the screen of a certain color may be fixed or may be changed. For example, the lighting apparatus 2 may change the lighting condition such that at least one display area displays a screen of a first color (e.g., red) for a first time (e.g., for two seconds) and then displays a screen of a second color (e.g., blue) that is different from the first color for a second time (e.g., for a second) that is different from the first time.

The information processing apparatus 3 is configured to perform a spoofing determination operation. Specifically, the information processing apparatus 3 is configured to receive the person image IMG transmitted from the camera 1 through the communication network 4. In addition, the information processing apparatus 3 is configured to determine whether or not the target in front of the camera 1 pretends to be another person who is different from the target, on the basis of the received person image IMG.

In this example embodiment, the information processing apparatus 3 is configured to determine whether or not the target pretends to be another person, by having the camera 1 image the display that displays another person pretended by the target (or a photograph including another person, and the same shall apply hereinafter). In this case, the information processing apparatus 3 determines whether or not the target pretends to be another person, by using properties of diffuse reflection in which properties of a reflected light from a three-dimensional face of a genuine person (e.g., a reflected light of at least one of the illumination light and an ambient light, and the same shall apply hereinafter) are different from properties of a reflected light from a planar human face displayed on the display.

Figure 2A:
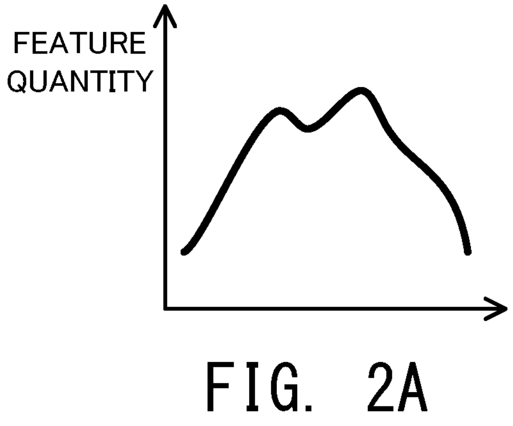
FIG. 2A is a diagram conceptually illustrating a feature quantity calculated from a person image including a target.
Figure 2B:
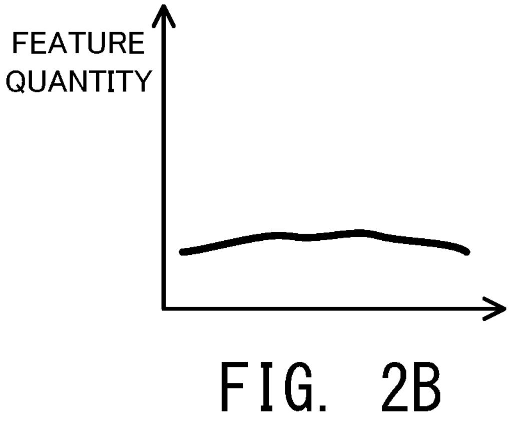
FIG. 2B is a diagram conceptually illustrating a feature quantity calculated from a person image including another person displayed on a display.

Specifically, the information processing apparatus 3 calculates a feature quantity that reflects a three-dimensional shape of the face of an imaged subject who is in the person image IMG, on the basis of the person image IMG. When the target does not pretend to be another person, the person image IMG includes the target because the camera 1 images the target. For this reason, in this case, the information processing apparatus 3 calculates the feature quantity corresponding to the three-dimensional shape (e.g., the feature quantity indicating three-dimensional features), as illustrated in FIG. 2A conceptually illustrating the feature quantity calculated from the person image IMG including the target. On the other hand, when target pretends to be another person, the person image IMG includes another person displayed on the display because the camera 1 images another person displayed on the display. For this reason, in this case, the information processing apparatus 3 calculates the feature quantity corresponding to a planar shape (e.g., the feature quantity indicating planar features), as illustrated in FIG. 2B conceptually illustrating the feature quantity calculated from the person image IMG including another person displayed on the display. Therefore, the information processing apparatus 3 is allowed to determine whether or not the target pretends to be another person, on the basis of the calculated feature quantity.

The information processing apparatus 3 may use an existing method as a method of calculating the feature quantity. For example, the information processing apparatus 3 may use a method described in at least one of Patent Literatures 1 to 6, as the method of calculating the feature quantity.

In the use of the properties of diffuse reflection, however, there may be a problem of color dependence. The problem of color dependence is a problem that the properties of a reflected light from the face of a person varies depending on the color of the face of the person. Specifically, the properties of a reflected light from the face of a first person whose skin color is a first color may be different from the properties of a reflected light from the face of a second person whose skin color is a second color that is different from the first color. Consequently, in a situation where neither the first person nor the second person pretends to be another person (i.e., the first person or the second person is in the person image IMG), it may be correctly determined that the first person does not pretend to be another person, but it may be erroneously determined that the second person pretends to be another person. Similarly, in a situation where the target pretends to be the first person (i.e., the first person displayed on the display is in the person image IMG), it may be correctly determined that the target pretends to be the first person, but in a situation where the target pretends to be the second person (i.e., the second person displayed on the display is in the person image IMG), it may be erroneously determined that the target does not pretend to be the second person. Thus, the method of determining whether or not the target pretends to be another person by using the properties of diffuse reflection, has such a technical problem that the accuracy of the determination may be reduced due to the problem of color dependence.

Therefore, in the example embodiment, the information processing apparatus 3 that is allowed to solve the above-described technical problem will be described. That is, in the example embodiment, a description will be given to the information processing apparatus 3 that is allowed to reduce an influence of color dependence when determining whether or not the target pretends to be another person, by using the properties of diffuse reflection.

Incidentally, the spoofing determination system SYS may include the camera 1, the lighting apparatus 2, and the information processing apparatus 3, as separate apparatuses. Alternatively, the information processing system SYS may be provided with a single apparatus including the camera 1, the lighting apparatus 2, and the information processing apparatus 3. For example, the information processing system SYS may include a smartphone or a tablet terminal including the camera 1, the lighting apparatus 2, and the information processing apparatus 3.

(1-2) Configuration of Information Processing Apparatus 3

Figure 3:
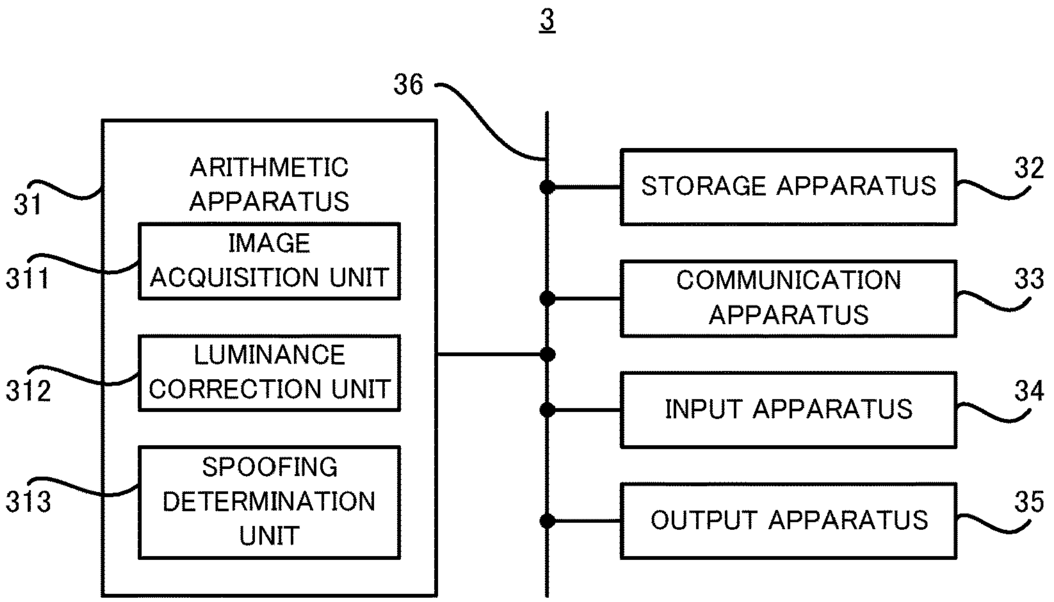
FIG. 3 is a block diagram illustrating a configuration of an information processing apparatus according to the example embodiment.

Subsequently, a configuration of the information processing apparatus 3 in the example embodiment will be described with reference to FIG. 3. FIG. 3 is a block diagram illustrating the configuration of the information processing apparatus 3 according to the example embodiment.

As illustrated in FIG. 3, the information processing apparatus 3 includes an arithmetic apparatus 31, a storage apparatus 32, and a communication apparatus 33. Furthermore, the information processing apparatus 3 may include an input apparatus 34 and an output apparatus 35. The information processing apparatus 3, however, may not include at least one of the input apparatus 34 and the output apparatus 35. The arithmetic apparatus 31, the storage apparatus 32, the communication apparatus 33, the input apparatus 34, and the output apparatus 35 may be connected through a data bus 36.

The arithmetic apparatus 31 includes at least one of, for example, a CPU (Central Processing Unit), a GPU (Graphics Processing Unit), and a FPGA (Field Programmable Gate Array). The arithmetic apparatus 31 reads a computer program. For example, arithmetic apparatus 31 may read a computer program stored in the storage apparatus 32. For example, the arithmetic apparatus 31 may read a computer program stored in a computer-readable, non-transitory recording medium, by using a not-illustrated recording medium reading apparatus provided by the information processing apparatus 3. The arithmetic apparatus 31 may obtain (i.e., download or read) a computer program from a not-illustrated apparatus disposed outside the information processing apparatus 3, through the communication apparatus 33 (or another communication apparatus). The arithmetic apparatus 31 executes the read computer program. Consequently, a logical functional block for performing an operation to be performed by the information processing apparatus 3 (e.g., the above-described spoofing determination operation) is implemented in the arithmetic apparatus 31. That is, the arithmetic apparatus 31 is allowed to function as a controller for implementing the logical function block for performing the operation (in other words, process) to be performed by information processing apparatus 3.

FIG. 3 illustrates an example of the logical functional block for performing the spoofing determination operation, implemented in the arithmetic apparatus 31. As illustrated in FIG. 3, an image acquisition unit 311 that is a specific example of an "acquisition unit", a luminance correction unit 312 that is a specific example of a "correction unit", and a spoofing determination unit 313 that is a specific example of a "determination unit" are implemented in the arithmetic apparatus 31. The image acquisition unit 311 is configured to obtain the person image IMG from the camera 1. The luminance correction unit 312 is configured to correct a luminance value of the person image IMG obtained by the image acquisition unit 311. Consequently, the luminance correction unit 312 is allowed to generate a corrected image IMG_mod corresponding to the person image IMG in which the luminance value is corrected. The spoofing determination unit 313 is configured to determine whether or not the target in the person image IMG (i.e., the target in front of the camera 1) pretends to be another person who is different from the target, on the basis of the corrected image IMG_mod generated by the luminance correction unit 312.

As described in detail later, in the example embodiment, the luminance correction unit 312 corrects the luminance value of the person image IMG, by which the influence of color dependence is reduced. That is, the luminance correction unit 312 corrects the luminance value of the person image IMG to reduce the influence of color dependence. Consequently, the determination accuracy of the spoofing determination unit 313 when the corrected image IMG_mod is used, is higher than the determination accuracy of the spoofing determination unit 313 when the corrected image IMG_mod is not used.

The storage apparatus 32 is configured to store desired data. For example, the storage apparatus 32 may temporarily store a computer program to be executed by the arithmetic apparatus 31. The storage apparatus 32 may temporarily store the data that are temporarily used by the arithmetic apparatus 31 when the arithmetic apparatus 31 executes the computer program. The storage apparatus 32 may store the data that are stored by the information processing apparatus 3 for a long time. The storage apparatus 32 may include at least one of a RAM (Random Access Memory), a ROM (Read Only Memory, a hard disk apparatus, a magneto-optical disk apparatus, and a SSD (Solid State Drive). That is, the storage apparatus 32 may include a non-transitory recording medium.

The communication apparatus 33 is configured to communicate with the camera 1 through the communication network 4. In the first example embodiment, the communication apparatus 33 receives (i.e., obtains) the person image IMG from the camera 1 through the communication network 4.

The input apparatus 34 is an apparatus that receives an input of information to the information processing apparatus 3, from outside the information processing apparatus 3. For example, the input apparatus 34 may include an operating apparatus (e.g., at least one of a keyboard, a mouse, and a touch panel) that is operable by an operator of the information processing apparatus 3. For example, the input apparatus 34 may include a reading apparatus that is configured to read information recorded as data in a recording medium that is externally attachable to the information processing apparatus 3.

The output apparatus 35 is an apparatus that outputs information to the outside of the information processing apparatus 3. For example, the output apparatus 35 may output the information as an image. That is, the output apparatus 35 may include a display apparatus (so-called display) that is configured to display an image indicating desired information to be outputted. For example, the output apparatus 35 may output information as audio. That is, the output apparatus 35 may include an audio apparatus (so-called speaker) that is configured to output audio. For example, the output apparatus 35 may output information to a paper surface. That is, the output apparatus 35 may include a print apparatus (so-called printer) that is configured to print desired information on the paper surface.

(2) Spoofing Determination Operation Performed by Information Processing Apparatus 3

Next, the spoofing determination operation performed by the information processing apparatus 3 will be described.

(2-1) Flow of Spoofing Determination Operation

Figure 4:
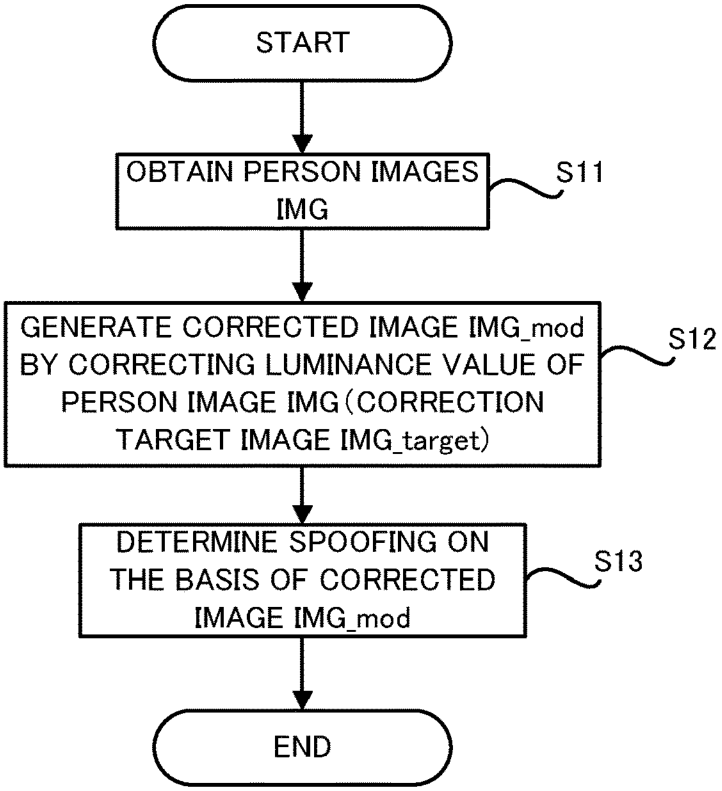
FIG. 4 is a flowchart illustrating a flow of a spoofing determination operation performed by the information processing apparatus according to the example embodiment.

First, a flow of the spoofing determination operation performed by the information processing apparatus 3 will be described with reference to FIG. 4. FIG. 4 is a flowchart illustrating the flow of the spoofing determination operation performed by the information processing apparatus 3.

As illustrated in FIG. 4, the image acquisition unit 311 obtains the person image IMG from the camera 1 by using the communication apparatus 33 (step S11).

In the example embodiment, the image acquisition unit 311 obtains a plurality of person images IMG respectively generated by imaging the target by using a plurality of different lighting conditions. For this reason, the lighting apparatus 2 changes the lighting condition at least once, while the camera 1 images the target. As an example, the lighting apparatus 2 may change the lighting condition between an OFF condition in which the target is not illuminated with the illumination light and an ON condition in which the target is illuminated with the illumination light. When the lighting apparatus 2 includes a first lighting unit that is configured to apply an illumination light toward the target from a first lighting direction, and a second lighting unit that is configured to apply an illumination light toward the target from a second lighting direction that is different from the first lighting direction, the lighting apparatus 2 may change the lighting condition among a first condition in which both the first and second lighting units do not illuminate the target with the illumination light, a second condition in which both the first and second lighting units illuminate the target with the illumination light, a third condition in which the first lighting unit illuminates the target with the illumination light, while the second lighting unit does not illuminate the target with the illumination light, and a fourth condition in which the second lighting unit illuminates the target with illumination light, while the first lighting unit does not illuminate the target with the illumination light. The first lighting direction may be, for example, a direction in which the target is illuminated with the illumination light from the right front of the target. The second lighting direction may be, for example, a direction in which the target is illuminated with the illumination light from the left front of the target.

For example, the display may be used as the lighting apparatus 2 as described above. In this case, the display used as the lighting apparatus 2 may change the lighting condition between an OFF condition in which the display does not emit a light (i.e., the display is turned off) and a ON condition in which the display emits a light (i.e., the display is turned on). The display used as the lighting apparatus 2 may change the lighting condition between a condition in which the color of the display surface of the display is a first color (i.e., a light of a wavelength presenting the first color is emitted from the display surface of the display) and a condition in which the color of the display surface of the display is a second color that is different from the first color (i.e., a light of a wavelength presenting the second color is emitted from the display surface of the display).

Figure 5A:
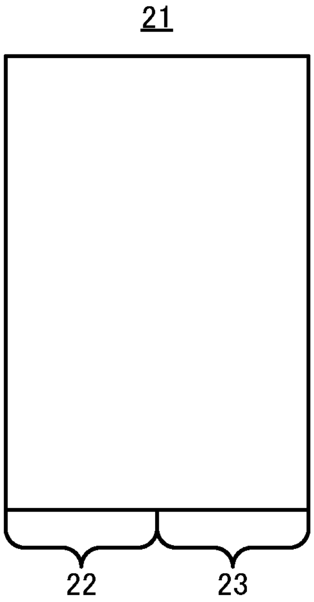
FIG. 5A to FIG. 5D are diagrams illustrating lighting conditions when a display surface of a display used as a lighting apparatus is divided into two display areas arranged in a horizontal direction (a lateral direction) of the display surface.
Figure 5B:
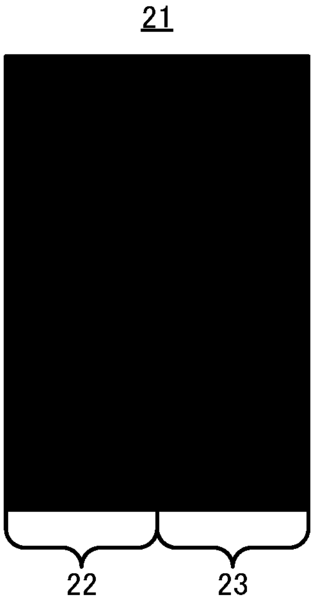
Figure 5C:
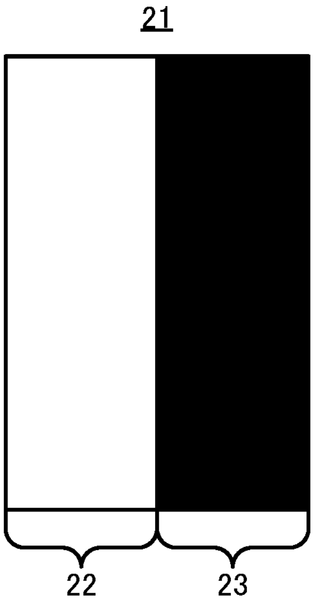
Figure 5D:
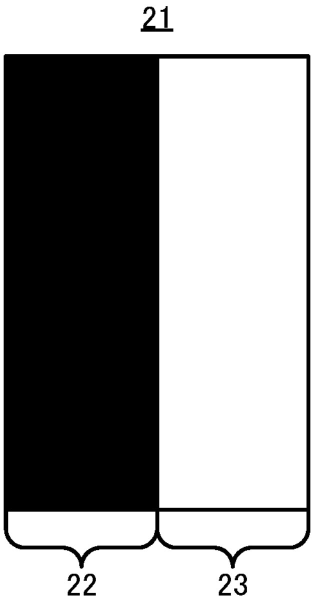

In addition, when the condition about the display aspect of each display area when the display surface of the display is divided into a plurality of display areas is used as the lighting condition, the display used as the lighting apparatus 2 may change the lighting condition between a first display condition in which a combination of the display aspects of the plurality of display areas is set to a first combination and a second display condition in which the combination of the display aspects of the plurality of display areas is set to a second combination that is different from the first combination. For example, the display used as the lighting apparatus 2 may change the lighting condition between a first display condition in which the luminance of a part of the plurality of display areas (e.g., a right half of the display surface of the display) is set to ae first luminance and the luminance of another part of the plurality of display areas (e.g., a right half of the display surface of the display) is set to a second luminance that is darker than the first luminance, and a second display condition in which the luminance of a part of the plurality of display areas (e.g., the right half of the display surface of the display) is set to the second luminance and the luminance of another part of the plurality of display area (e.g., the right half of the display surface of the display) is set to the first luminance. As a specific example, FIGS. 5 A to 5 D illustrate the lighting conditions when the display surface of a display 21 used as the lighting apparatus 2 is divided into two display areas 22 and 23 arranged in in a horizontal direction (a lateral direction) of the display surface. FIG. 5A illustrates a lighting condition in which both the two display areas 22 and 23 emit a light (or the luminance of both the two display areas 22 and 23 are set to a first luminance that is relatively bright). FIG. 5B illustrates a lighting condition in which both the two display areas 22 and 23 do not emit a light (or the luminance of both the two display areas 22 and 23 is set to a second luminance that is relatively dark). FIG. 5C illustrates a lighting condition in which the display area 22 emits a light (or the luminance of the display area 22 is set to the first luminance that is relatively bright), while the display area 23 does not emit a light (or the luminance of the display area 23 is set to the second luminance that is relatively dark). FIG. 5D illustrates a lighting condition in which the display area 23 emits a light (or the luminance of the display area 23 is set to the first luminance that is relatively bright), while the display area 22 does not emit a light (or the luminance of the display area 22 is set to the second luminance that is relatively dark).

In the following description, for convenience of explanation, an example in which the lighting apparatus 2 changes the lighting condition among the first condition and the fourth condition will be described. In this case, the image acquisition unit 311 obtains a person image IMG generated when the lighting condition is set to the first condition (hereinafter referred to as a "person image IMG1"), a person image IMG generated when the lighting condition is set to the second condition (hereinafter referred to as a "person image IMG2"), a person image IMG generated when the lighting condition is set to the third condition (hereinafter referred to as a "person image IMG3"), and a person image IMG generated when the lighting condition is set to the fourth condition (hereinafter referred to as a "person image IMG4").

Then, the luminance correction unit 312 corrects the luminance value of at least one of the person images IMG1 to IMG4 obtained in the step S11 (i.e., a plurality of person images IMG, and the same shall apply hereinafter) (step S12). Specifically, the luminance correction unit 312 selects at least one of the person images IMG1 to IMG4 obtained in the step S11 (i.e., the plurality of person images IMG), as a correction target image IMG_target for correcting the luminance value. For example, the luminance correction unit 312 may randomly select at least one of the person images IMG1 to IMG4*m* as the correction target image IMG_target. For example, the luminance correction unit 312 may select at least one of the person images IMG1 to IMG4 that satisfies a predetermined correction target image selection condition, as the correction target image IMG_target. Then, the luminance correction unit 312 corrects the luminance value of the selected correction target image IMG_target. Consequently, the luminance correction unit 312 generates the corrected image IMG_mod corresponding to the correction target image IMG_target in which the luminance value is corrected (step S12).

The luminance correction unit 312 may select all the person images IMG1 to IMG4, as the correction target image IMG_target. In this case, the luminance correction unit 312 generates a corrected image IMG_mod1 corresponding to the person image IMG1 in which the luminance value is corrected, a corrected image IMG_mod2 corresponding to the person image IMG2 in which the luminance value is corrected, a corrected image IMG_mod3 corresponding to the person image IMG3 in which the luminance value is corrected, and a corrected image IMG_mod4 corresponding to the person image IMG4 in which the luminance value is corrected.

Alternatively, the luminance correction unit 312 may select at least one of the person images IMG1 to IMG4 as the correction target image IMG_target, but may not select at least another of the person images IMG1 to IMG4 as the correction target image IMG_target. In this case, the luminance correction unit 312 corrects the luminance value of the person image IMG selected as the correction target image IMG_target, thereby to generate the corrected image IMG_mod corresponding to the corrected person image IMG in which the luminance value is corrected. On the other hand, the luminance correction unit 312 may not correct the luminance vqalue of the person image IMG that is not selected as the correction target image IMG_target. In this case, the person image IMG that is not selected as the correction target image IMG_target, may be used as the corrected image IMG_mod actually used by the spoofing determination unit 313 to determine whether or not the target pretends to be another person.

In the example embodiment, in order to correct the luminance value of the correction target image IMG_target, the luminance correction unit 312 selects at least one of the person images IMG1 to IMG4, as a base image IMG_base. For example, the luminance correction unit 312 may randomly select at least one of the person images IMG1 to IMG4, as the base image IMG_base. For example, the luminance correction unit 312 may select at least one of the person images IMG1 to IMG 4 that satisfies a predetermined base image selection condition, as the base image IMG_base. Then, the luminance correction unit 312 corrects the luminance value of the correction target image IMG_target, by using the base image IMG_base. Specifically, the luminance correction unit 312 corrects the luminance value of the correction target image IMG_target, by using at least one of a mean value μ_base and a variance v_base of the luminance value of the base image IMG_base.

The "mean value of the luminance value of an image" in the example embodiment may mean a mean value of the luminance values of a plurality of pixels that constitute the image. Specifically, the "mean value of the luminance value of the image" may mean a median value of the sum of the luminance values of the plurality of pixels that constitute the image.

A detailed description of a specific correction method for correcting the luminance value of the correction target image IMG_target by using the base image IMG_base will be described in detail later and thus will be omitted here.

After that, the spoofing determination unit 313 determines whether or not the target in the person image IMG pretends to be another person, on the basis of the corrected image IMG_mod generated in the step S13 (step S13). For example, when four person images IMG are obtained in the step S11, four corrected images IMG_mod are generated in the step S12. As described above, at least one of the four corrected images IMG_mod may be the person image IMG in which the luminance value is not corrected. In this case, the spoofing determination unit 313 may calculate the above-described feature quantity by using at least one of the four corrected images IMG_mod, and may determine whether or not the target pretends to be another person on the basis of the calculated feature quantity.

(2-2) Specific Example of Correction Method for Correcting Luminance Value of Correction Target Image IMG_target Next, a specific example of the correction method for correcting the luminance value of the correction target image IMG_target by using the base image IMG_base will be described. In the following, a first correction method to a third correction method will be described as the correction method for correcting the luminance value of the correction target image IMG_target by using the base image IMG_base. In this case, the luminance correction unit 312 may select any one of the first correction method to the third correction method, as the correction method actually used for correcting the luminance value of the correction target image IMG_target. For example, the luminance correction unit 312 may randomly select any one of the first correction method to the third correction method. For example, the luminance correction unit 312 may select any one of the first correction method and the third correction method that satisfies a predetermined method selection condition.

(2-2-1) First Correction Method for Correcting Luminance Value of Correction Target Image IMG_target First, the first correction method for correcting the luminance value of the correction target image IMG_target by using the base image IMG_base will be described. The first correction method is a method of selecting any one of the person images IMG 1 to IMG4 as the base image IMG_base, selecting each of the remaining three of the person images IMG1 to IMG4 other than the base image IMG_base as the correction target image IMG_target, and correcting the respective luminance values of the three correction target images IMG_target by using the mean value μ_base of the luminance value of the base image IMG_base.

In this case, the luminance correction unit 312 calculates the mean value μ_base of the luminance value of the base image IMG_base. For example, the luminance correction unit 312 may calculate the mean value μ_base of the luminance value of the base image IMG_base by using Equation 1. "Hb" in Equation 1 indicates the number of pixels in a vertical or longitudinal direction of the base image IMG_base. "Wb" in Equation 1 indicates the number of pixel in a horizontal or lateral direction of the base image IMG_base. "Pb(i,j)" in Equation 1 indicates the luminance value of a pixel that constitutes the base image IMG_base and that have a coordinate value of i in the vertical direction and a coordinate value of j in the horizontal direction. Accordingly, Equation 1 indicates a mathematical expression for calculating an arithmetical mean (in other words, a simple average or arithmetic mean) calculated by dividing the sum of the luminance values of Hb×Wb pixels that constitute the base image IMG_base by the total number of the pixels that constitute the base image IMG_base, as the mean value μ_base of the luminance value of the base image IMG_base.

$$\mu\_\text{base} = \frac{1}{Hb \times Wb} \sum_{i=1}^{Hb} \sum_{j=1}^{Wb} pb(i, j) \qquad \text{[Equation 1]}$$

Then, the luminance correction unit 312 corrects the respective luminance values of the three correction target images IMG_target, by using the mean value μ_base of the luminance value of the base image IMG_base. Specifically, the luminance correction unit 312 calculates a mean value μ_target of the luminance value of each of the three correction target images IMG_target. For example, the luminance correction unit 312 may calculate the mean value μ_target of the luminance value of the correction target image IMG_target by using Equation 2. "Ht" in Equation 2 indicates the number of pixels in a vertical or longitudinal direction of the correction target image IMG_target. "Wt" in Equation 2 indicates the number of pixels in a horizontal or lateral direction of the correction target image IMG_target. "Pt(i,j)" in Equation 2 illustrates the luminance value of a pixel that constitutes the correction target image IMG_target and that has a coordinate value of i in the vertical direction and a coordinate value of j in the horizontal direction. Accordingly, similarly to Equation 1, Equation 2 indicates a mathematical expression for calculating an arithmetical mean calculated by dividing the sum of the luminance values of Ht×Wt pixels that constitute the correction target image IMG_target by the total number of the pixels that constitute the correction target image IMG_target. Then, the luminance correction unit 312 corrects the luminance value of each correction target image, by using the mean value μ_base of the luminance value of the base image IMG_base and the mean value μ_target of the luminance value of each correction target image IMG_target. For example, the luminance correction unit 312 may correct the luminance value of each correction target image IMG_target by using Equation 3. Incidentally, "pt_mod (i,j)" in Equation 3 indicates the luminance value after the correction of the pixel that constitutes the correction target image IMG_target and that has a coordinate value of i in the vertical direction and a coordinate value of j in the horizontal direction. That is, Equation 3 indicates a mathematical expression for correcting the luminance value of the correction target image IMG_target (i.e., generating the corrected image IMG_mod in which the pixel with a coordinate value of i in the vertical direction and a coordinate value of j in the horizontal direction has a luminance value of pt_mod (i,j)), by subtracting the mean value μ_target of the luminance value of each correction target image IMG_target from and by adding the mean value μ_base of the luminance value of the base image IMG_base to the luminance value pt(i,j) of each pixel of the correction target image IMG_target.

$$\mu\_\text{target} = \frac{1}{Ht \times Wt} \sum_{i=1}^{Ht} \sum_{j=1}^{Wt} pt(i, j) \quad \text{[Equation 2]}$$

$$\text{pt\_mod}(i, j) = pt(i, j) - \mu\_\text{target} + \mu\_\text{base} \quad \text{[Equation 3]}$$

Such a first correction method generates three corrected images IMG_mod corresponding to three correction target images IMG_target (i.e., person images IMG) in which the luminance value is corrected. On the other hand, the luminance value of one person image IMG selected as the base image IMG_base may not be corrected. In this case, the one person image IMG selected as the base image IMG_base may be used as the corrected image IMG_mod actually used by the spoofing determination unit 313 to determine whether or not the target pretends to be another person.

(2-2-2) Second Correction Method for Correcting Luminance Value of Correction Target Image IMG_target Next, a second correction method for correcting the luminance value of the correction target image IMG_target by using the base image IMG_base will be described. The second correction method is a correction method of selecting any one of the person images IMG1 to IMG4 as the base image IMG_base, selecting each of the remaining three of the person images IMG1 to IMG4 other than the base image IMG_base as the correction target image IMG_target, and correcting the respective luminance values of the three correction target images IMG_target by using the mean value μ_base and the variance v_base of the luminance value of the base image IMG_base.

In this case, the luminance correction unit 312 calculates the mean value μ_base of the luminance value of the base image IMG_base. The method of calculating the mean value μ_base is already described. Furthermore, the luminance correction unit 312 calculates the variance v_base of the luminance value of of the base image IMG_base. For example, the luminance correction unit 312 may calculate the variance v_base of the luminance value of the base image IMG_base by using Equation 4.

$$\text{v\_base} = \frac{1}{Hb \times Wb} \sum_{i=1}^{Hb} \sum_{j=1}^{Wb} (pb(i, j) - \mu\_\text{base})^2 \quad \text{[Equation 4]}$$

Then, the luminance correction unit 312 corrects the respective luminance values of the three correction target images IMG_target, by using the mean value μ_base and the variance v_base of the luminance value of the base image IMG_base. Specifically, the luminance correction unit 312 calculates the mean value μ_target of the luminance value of each of the three correction target images IMG_target. The method of calculating the mean value μ_target is already described. Furthermore, the luminance correction unit 312 calculates a variance v_target of the luminance value of each of the three correction target images IMG_target. For example, the luminance correction unit 312 may calculate the variance v_target of the luminance value of the correction target image IMG_target, by using Equation 5. Then, the luminance correction unit 312 corrects the luminance value of each correction target image IMG_target, by using the mean value μ_base and the variance v_base of the luminance value of the base image IMG_base and the mean value μ_target and the variance v_target of the luminance value of each correction target image IMG_target. For example, the luminance correction unit 312 may correct the luminance value of each correction target image IMG_target by using Equation 6. Equation 6 a mathematical expression for collecting the luminance value of the correction target image IMG_target (i.e., generating the corrected image IMG_mod), (i) by performing a first calculation of subtracting the mean value μ_target of the luminance value of each correction target image IMG_target from the luminance value pt(i,j) of each pixel of each correction target image IMG_target, (ii) by performing a second calculation of dividing a result of the first calculation by the variance v_target of the luminance value of each correction target image IMG_target and multiplying a result thereof by the variance v_base of the luminance value of the base image IMG_base, and (iii) by performing a third calculation of adding the mean value μ_base of the luminance values of the base image IMG_base to a result of the second calculation.

$$\text{v\_target} = \frac{1}{Ht \times Wt} \sum_{i=1}^{Ht} \sum_{j=1}^{Wt} (pt(i, j) - \mu\_\text{target})^2 \quad \text{[Equation 5]}$$

$$\text{pt\_mod}(i, j) = \frac{pt(i, j) - \mu\_\text{target}}{\text{v\_target}} \times \text{v\_base} + \mu\_\text{base} \quad \text{[Equation 6]}$$

Such a second correction method generates three corrected images IMG_mod corresponding to the three correction target images IMG_target (i.e., the person images IMG) in which the luminance value is corrected. On the other hand, the luminance value of one person image IMG selected as the base image IMG_base may not be corrected. In this case, one person image IMG selected as the base image IMG_base may be used as the corrected image IMG_mod actually used by the spoofing determination unit 313 to determine whether or not the target pretends to be another person.

(2-2-3) Third Correction Method for Correcting Luminance Value of Correction Target Image IMG_target Next, a third correction method for correcting the luminance value of the correction target image IMG_target by using the base image IMG_base will be described. The third correction method is a correction method of selecting each of the person images IMG1 to IMG4 as the base image IMG_base, selecting each of the person images IMG1 to IMG4 as the correction target image IMG_target, and correcting the luminance value of each of four correction target images IMG_target by using the mean value μ_base and the variance v_base of the luminance values of the four base images IMG_base.

In this case, the luminance correction unit 312 calculates a mean value μ_all of the luminance values of the four base images IMG_base (i.e., all the base images IMG_base). For example, the luminance correction unit 312 may calculate the mean value μ_all of the luminance values of the four base images IMG_base by using Equation 7. "Nb" in Equation 7 indicates the total number of the base images IMG_base. Accordingly, Equation 7 indicates a mathematical expression for calculating an arithmetical mean calculated by dividing the sum of the luminance values of Nb×Hb×Wb pixels that constitute the four base images IMG_base by the total number of pixels that constitute the four base images IMG_base, as the mean value μ_all of the luminance values of the four base images IMG_base.

$$\mu\_\text{all} = \frac{1}{Nb \times Hb \times Wb} \sum_{k=1}^{Nb} \sum_{i=1}^{Hb} \sum_{j=1}^{Wb} pb(i, j) \quad \text{[Equation 7]}$$

In addition, the luminance correction unit 312 calculates a variance v_all of the luminance values of the four base images IMG_base (i.e., all the base images IMG_base). For example, the luminance correction unit 312 may calculate the variance v_all of the luminance values of the four base images IMG_base by using Equation 8.

$$\text{v\_all} = \frac{1}{Nb \times Hb \times Wb} \sum_{k=1}^{Nb} \sum_{i=1}^{Hb} \sum_{j=1}^{Wb} (pb(i, j) - \mu\_\text{all})^2 \quad \text{[Equation 8]}$$

Then, the luminance correction unit 312 corrects the luminance value of each of the four correction target images IMG_target by using the mean value μ_all and the variance v_all of the luminance values of the four base images IMG_base. Specifically, the luminance correction unit 312 calculates the mean value μ_target and the variance v_target of the luminance value of each of the four correction target images IMG_target. The method of calculating the mean value μ_target and the variance v_target is already described. Then, the luminance correction unit 312 corrects the luminance value of each correction target image IMG_target, by using the mean value μ_all and the variance v_all of the luminance values of the four base images IMG_base, and the mean value μ_target and the variance v_target of the luminance value of each correction target image IMG_target. For example, the luminance correction unit 312 may correct the luminance value of each correction target image IMG_target by using Equation 9. Equation 9 indicates a mathematical expression for correcting the luminance value of the correction target image IMG_target correcting (i.e., generating the corrected image IMG_mod), (i) by performing a fourth calculation of subtracting the mean value μ_target of each correction target image IMG_target from the luminance value pt(i,j) of each pixel of each correction target image IMG_target, (ii) by performing a fifth calculation of dividing a result of the fourth calculation by the variance v_target of the luminance value of each correction target image IMG_target and multiplying a result thereof by the variance v_all of the luminance values of all the base images IMG_base, and (iii) by performing a sixth calculation of adding the mean value μ_all of the luminance values of all the base images IMG_base to a result of the fifth calculation. The formula for is illustrated.

$$\text{pt\_mod}(i, j) = \frac{pt(i, i) - \mu\_\text{target}}{\text{v\_target}} \times \text{v\_all} + \mu\_\text{all} \quad \text{[Equation 9]}$$

Such a third correction method generates four corrected images IMG_mod corresponding to the four correction target images IMG_target (i.e., the person images IMG) in which the luminance value is corrected.

(3) Technical Effect of Information Processing Apparatus 3

As described above, in the example embodiment, the information processing apparatus 3 generates the corrected image IMG_mod, by correcting the luminance value of the correction target image IMG_target by using at least one of the mean value μ_base and the variance v_base of the luminance value of the base image IMG_base. Furthermore, the information processing apparatus 3 determines whether or not the target pretends to be another person on the basis of the corrected image IMG_mod. That is, instead of determining whether or not the target pretends to be another person on the basis of the plurality of person images IMG, the information processing apparatus 3 determines whether or not the target pretends to be another person on the basis of the corrected image IMG_mod. Consequently, the determination accuracy of the spoofing determination unit 313 when the corrected image IMG_mod is used is higher than the determination accuracy of the spoofing determination unit 313 when the corrected image IMG_mod is not used. That is, the information processing apparatus 3 is allowed to reduce the influence of color dependence, when determining whether or not the target pretends to be another person by using the properties of diffuse reflection.

Figure 6:
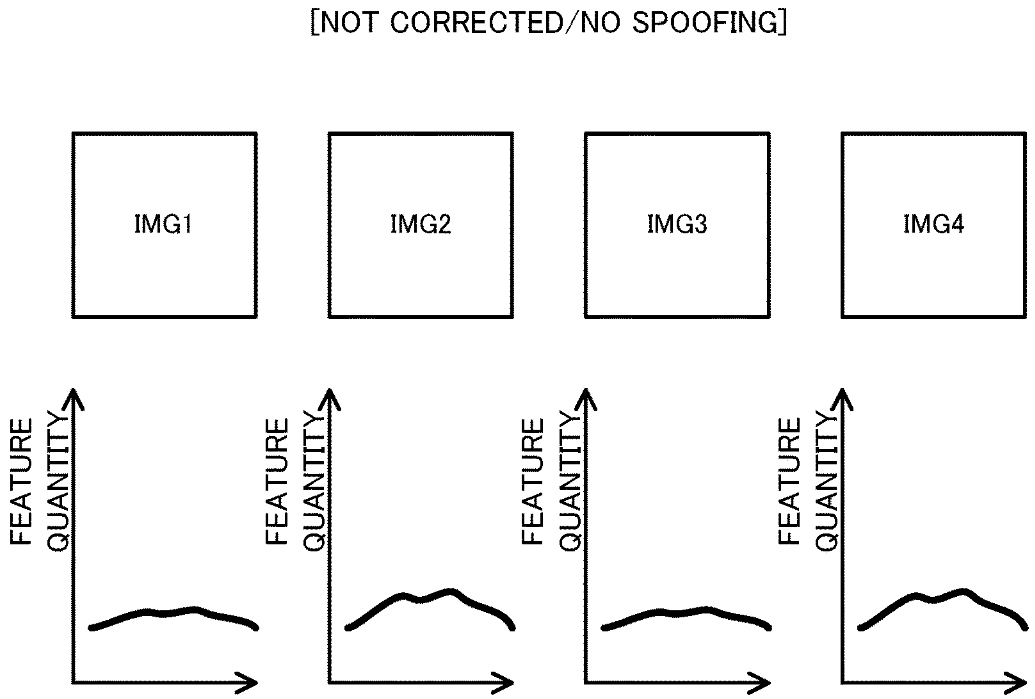
FIG. 6 is a diagram conceptually illustrating an example of the feature quantity calculated from the person image obtained in a step S11 in FIG. 4, in a situation where the target does not pretend to be another person.

Specifically, FIG. 6 conceptually illustrates an example of the feature quantity calculated from the four person images IMG1 to IMG4 obtained in the step S11 in FIG. 4, in a situation where the target does not pretend to be another person. FIG. 6 illustrates an example in which the feature quantity corresponding to the three-dimensional shape (e.g., the feature quantity indicating three-dimensional features) should be calculated, but the feature quantity corresponding to the planar shape (e.g., the feature quantity representing planar features) is calculated due to the influence of color dependence (i.e., due to a skin color of the target). In this case, although the spoofing determination unit 313 should determine that the target does not pretend to be another person, it may erroneously determine that the target pretends to be another person on the basis of the feature quantity illustrated in FIG. 6.

Figure 7:
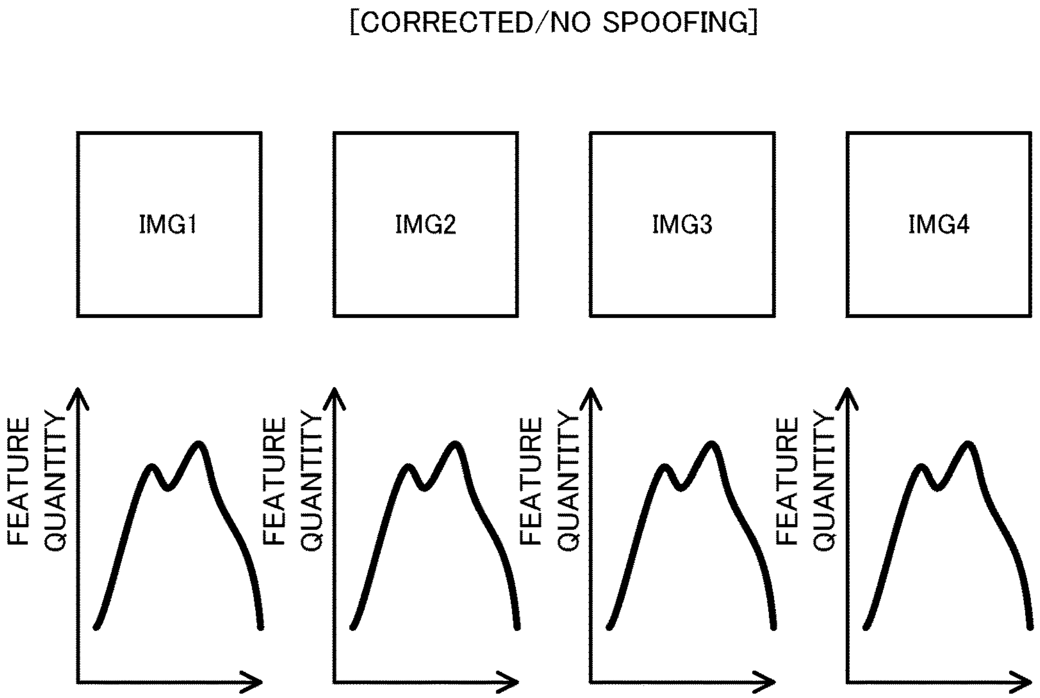
FIG. 7 is a diagram conceptually illustrating an example of the feature quantity a corrected image generated from the person image illustrated in FIG. 6.

On the other hand, FIG. 7 conceptually illustrates an example of the feature quantity calculated from the four corrected images IMG_mod respectively generated from the person images IMG1 to IMG4 illustrated in FIG. 6. As illustrated in FIG. 7, even in a situation where the feature quantity corresponding to the planar shape (e.g., the feature quantity indicating planar features) is calculated from the person images IMG1 to IMG4, the feature quantity calculated from the corrected images IMG_mod is the feature quantity corresponding to the three-dimensional shape (e.g., the feature quantity indicating three-dimensional features). This is because at least one of the mean value μ_base and the variance v_base of the luminance value of the base image IMG_base is reflected in all the corrected images IMG_mods, and thus, the influence of color dependence included in each of the person images IMG1 to IMG4 is reduced (typically, canceled). From another point of view, it is because at least one of the mean value μ_base and the variance v_base of the luminance value of the base image IMG_base is reflected in all the corrected images IMG_mod, and thus, a difference in brightness (i.e., the luminance value) between the plurality of corrected images IMG_mod in which the luminance value is corrected, is less than a difference in brightness between the plurality of person images IMG in which the luminance value is not corrected. From a further point of view, it is because at least one of the mean value μ_base and the variance v_base of the luminance value of the base image IMG_base is reflected in all the corrected images IMG_mod, and thus, a difference in contrast (i.e., variation in the luminance value) between the plurality of corrected images IMG_mod in which the luminance value is corrected, is less than a difference in contrast between the plurality of person images IMG in which the luminance value is not corrected. Especially, since the brightness and the contrast vary depending on the skin color of the target in the person image IMG, it is significantly beneficial that the difference in the brightness and the contrast is reduced by correcting the luminance value. As a result, the spoofing determination unit 313 is allowed to correctly determine that the target does not pretend to be another person, on the basis of the feature quantity illustrated in FIG. 7, in a situation where it should determine that the target does not pretend to be another person. That is, by using the corrected image IMG_mod, it is less likely that the determination unit 313 erroneously determines that the target pretends to be another person in a situation where it should determine that the target does not pretend to be another person.

Although this is not illustrated in the drawings to avoid duplicate explanations, the same shall apply in a situation where the target pretends to be another person. That is, when the feature quantity is calculated from the person images IMG1 to IMG4, the spoofing determination unit 313 may erroneously determine that the target does not pretend to be another person even though it should determine that the target pretends to be another person. On the other hand, when the feature quantity is calculated from the corrected image IMG_mod, the spoofing determination unit 313 is allowed to correctly determine that the target pretends to be another person in a situation where it should determine that the target pretends to be another person.

As described above, the information processing apparatus 3 may correct the luminance value of the correction target image IMG_target, by using the first correction method of subtracting the mean value μ_target of the luminance value of each correction target image IMG_target from and adding the mean value μ_base of the luminance value of the base image IMG_base to the luminance value pt(i,j) of each pixel of each correction target image IMG_target. In this case, a luminance value pt_mod(i,j) of each pixel of each corrected image IMG_mod is a value obtained by adding a difference (=pt(i,j)−μ_target) between the luminance value pt(i,j) the mean value μ_target of each pixel of each correction target image IMG_target, to the mean value μ_base of the luminance value of the base image IMG_base. Consequently, the luminance value pt_mod(i, j) of each pixel of each corrected image IMG_mod is a value that depends on the difference between the luminance value pt(i, j) and the mean value μ_target. Here, although the influence of color dependence is included in both the luminance value pt(i, j) and the mean value μ_target, the influence of color dependence is eliminated from the difference between the luminance value pt(i, j) and the mean value μ_target because the difference between the luminance value pt(i, j) and the mean value μ_target is calculated. As a consequence, the luminance value pt_mod(i, j) of each pixel of each corrected image IMG_mod is substantially a value in which the influence of color dependence is eliminated. For this reason, the information processing apparatus 3 is allowed to reduce the influence of color dependence when determining whether or not the target pretends to be another person by using the properties of diffuse reflection.

Similarly, even when the luminance value of the correction target image IMG_target is corrected by using each of the second and third correction methods described above, the luminance value pt_mod(i, j) of each pixel of each corrected image IMG_mod is a value obtained by adding the difference (=pt(i, j)−μ_target) between the luminance value μ_base and the mean value μ_target of each pixel of each correction target image IMG_target, to the mean value μ_base of the luminance value of the base image IMG_base. Consequently, the luminance value pt_mod(i, j) of each pixel of each corrected image IMG_mod is a value that depends on the difference between the luminance value pt(i, j) and the mean value μ_target. Since the influence of color dependence is eliminated from the difference between the luminance value pt(i, j) and the mean value μ_target as described above, the luminance value pt_mod(i, j) of each pixel of each corrected image IMG_mod is substantially a value in which the influence of color dependence is eliminated. Therefore, even when each of the second and third correction methods is used, as in the case where the first correction method is used, the information processing apparatus 3 is allowed to reduce the influence of color dependence when determining whether or not the target pretends to be another person by using the properties of diffuse reflection.

The operation of correcting the luminance value of the correction target image IMG_target is an operation of correcting the luminance value of the correction target image IMG_target on the basis of a certain rule. That is, it can be said that the operation of correcting the luminance value of the correction target image IMG_target is an operation of transforming the correction target image IMG_target such that the determination unit 313 is allowed to determine whether or not the target pretends to be another person with high accuracy. For this reason, the operation of correcting the luminance value of the correction target image IMG_target may be regarded as an operation of normalizing the correction target image IMG_target (especially, normalizing the luminance value of the correction IMG_target). That is, "correcting the luminance value of the correction target image IMG_target" in the example embodiment may be referred to as "normalizing the luminance value of the correction target image IMG_target".

(4) Modified Example

(4-1) First Modification

In the above description, the arithmetical mean is used as each of the mean value μ_base of the luminance value of the base image IMG_base and the mean value μ_target of the luminance value of the correction target image IMG_target. As each of the mean value μ_base of the luminance value of the base image IMG_base and the mean value μ_target of the luminance value of the correction target image IMG_target, however, a different type of mean from the arithmetical mean may be used. For example, at least one of a geometric mean (in other words, a geometrical mean), a harmonic mean, a logarithmic mean, and a weighted mean may be used as each of the mean value μ_base of the luminance value of the base image IMG_base and the mean value μ_target of the luminance value of the correction target image IMG_target. That is, any index value that indicates any type of mean of the luminance value of the base image IMG_base may be used as the mean value μ_base of the luminance value of the base image IMG_base. In any case, the "mean value of the luminance value of the image" in the example embodiment means the mean value (i.e., the median value) of the luminance values of the plurality of pixels that constitute the image.

(4-2) Second Modified Example

In the above description, each of the variance v_base of the luminance value of the base image IMG_base and the variance v_target of the luminance value of the correction target image IMG_target is used. Instead of the variance v_base of the luminance value of the base image IMG_base, however, a standard deviation abase of the luminance value of the base image IMG_base (i.e., non-negative square root of the variance v_base) may be used. Similarly, instead of the variance v_target of the luminance value of the correction target image IMG_target, a standard deviation σ_target of the luminance value of the correction target image IMG_target (i.e., non-negative square root of the variance v_target) may be used. Both the variance and the standard deviation indicate a degree of variation in the luminance value. Therefore, instead of the variance v_base of the luminance value of the base image IMG_base, any index value indicating the degree of variation in the luminance value of the base image IMG_base may be used. Similarly, instead of the variance v_target of the luminance value of the correction target image IMG_target, any index value indicating the degree of variation in the luminance value of the correction target image IMG_target may be used. In the example embodiment, the "variation in the luminance value of the image" may mean the degree of variation in the luminance value between the plurality of pixels that constitute the image (i.e., the degree of irregularity, and the luminance value that allows quantitative evaluation of whether or not the luminance values are even among the plurality of pixels). In any case, it means the mean value (i.e., the median value)

(4-3) Third Modified Example

The correction method for correcting the luminance value of the correction target image IMG_target by using the base image IMG_base, is not limited to the above-described first to third correction method. The luminance correction unit 312 may correct the luminance value of the correction target image IMG_target, by using a correction method that is different from the first correction method to the third correction method.

For example, the luminance correction unit 312 may correct the luminance value of the correction target image IMG_target by using a fourth correction method described below. The fourth correction method is a correction method of selecting any one of the person images IMG1 to IMG4 as the base image IMG_base, selecting each of the remaining three of the person images IMG1 to IMG4 other than the base image IMG_base as the correction target image IMG_target, and correcting the luminance value of each of the three correction target images IMG_target by using the variance v_base of the luminance value of the base image IMG_base.

In this case, the luminance correction unit 312 calculates the variance v_base of the luminance value of the base image IMG_base. Then, the luminance correction unit 312 corrects the luminance value of each of the three correction target images IMG_target by using the variance v_base of the luminance value of the base image IMG_base. Specifically, the luminance correction unit 312 calculates the variance v_target of the luminance value of each of the three correction target images IMG_target. Then, the luminance correction unit 312 corrects the luminance value of each correction target image, by using the variance v_base of the luminance value of the base image IMG_base and the variance v_target of the luminance value of each correction target image IMG_target. For example, the luminance correction unit 312 may correct the luminance value of each correction target image IMG_target by using Equation 10. Equation 10 indicates a mathematical expression for correcting the luminance value of the correction target image IMG_target (i.e., generating the corrected image IMG_mod), by dividing the luminance value pt(i, j) of each pixel of each correction target image IMG_target by the variance v_target of the luminance value of each correction target image IMG_target and multiplying a result thereof by the variance v_base of the luminance value of the base image IMG_base.

$$\mathrm{pt\_mod}(i, j) = \frac{pt(i, j)}{\mathrm{v\_target}} \times \mathrm{v\_base} \qquad \text{[Equation 10]}$$

(5) Supplementary Notes

With respect to the example embodiments described above, the following Supplementary Notes are further disclosed.

Supplementary Note 1

An information processing apparatus including:

an acquisition unit that obtains a plurality of person images which are generated by imaging a target by using a plurality of different lighting conditions, respectively;

a correction unit that performs a correction process of correcting a luminance value of at least one of the plurality of person images, by using at least one of a first index value indicating a mean of a luminance value of at least one of the plurality of person images, and a second index value indicating a degree of variation in the luminance value of the at least one of the plurality of person images; and a determination unit that determines whether or not the target pretends to be another person, on the basis of the person image in which the luminance value is corrected.

Supplementary Note 2

The information processing apparatus according to Supplementary Note 1, wherein the first index value indicates the mean of the luminance value of a first person image of the plurality of person images, and the correction process includes a process of subtracting the mean of the luminance value of a second person image of the plurality of person images that is different from the first person image from and adding the first index value to the luminance value of the second person image.

Supplementary Note 3

The information processing apparatus according to Supplementary Note 1 or 2, wherein the first index value indicates the mean of the luminance value of a first person image of the plurality of person images, the second index value indicates the degree of variation in the luminance value of the first person image, and the correction process includes a process of: (i) performing a first calculation of subtracting the mean of the luminance value of a second person image of the plurality of person images that is different from the first person image, from the luminance value of the second person image, (ii) performing a second calculation of dividing a result of the first calculation by a third index value indicating a degree of variation in the luminance value of the second person image and multiplying a result thereof by the second index value, and (iii) performing a third calculation of adding the first index value to a result of the second calculation.

Supplementary Note 4

The information processing apparatus according to any one of Supplementary Notes 1 to 3, wherein the first index value indicates the mean of the luminance values of the plurality of person images, the second index value indicates the degree of variation in the luminance values of the plurality of people images, and the correction process includes a process of: (i) performing a fourth calculation of subtracting the mean of the luminance value of one person image that is each of the plurality of person images, from the luminance value of the one person image, (ii) performing a fifth calculation of dividing a result of the fourth calculation by a fourth index value indicating a variation in the luminance value of the one person image and multiplying a result thereof by the second index value, and (iii) performing a sixth calculation of adding the first index value to a result of the fifth calculation.

Supplementary Note 5

An information processing method including:

obtaining a plurality of person images which are generated by imaging a target by using a plurality of different lighting conditions, respectively;

performing a correction process of correcting a luminance value of at least one of the plurality of person images, by using at least one of a first index value indicating a mean of a luminance value of at least one of the plurality of person images, and a second index value indicating a degree of variation in the luminance value of the at least one of the plurality of person images; and determining whether or not the target pretends to be another person, on the basis of the person image in which the luminance value is corrected.

Supplementary Note 6

A recording medium on which a computer program that allows a computer to execute an information processing method is recorded, the information processing method including:

obtaining a plurality of person images which are generated by imaging a target by using a plurality of different lighting conditions, respectively;

performing a correction process of correcting a luminance value of at least one of the plurality of person images, by using at least one of a first index value indicating a mean of a luminance value of at least one of the plurality of person images, and a second index value indicating a degree of variation in the luminance value of the at least one of the plurality of person images; and determining whether or not the target pretends to be another person, on the basis of the person image in which the luminance value is corrected.

At least a part of the constituent components of the above-described example embodiments can be combined with at least another part of the constituent components of the above-described example embodiments, as appropriate. A part of the constituent components of the above-described example embodiments may not be used. Furthermore, to the extent permitted by law, all the references (e.g., publications) cited in this disclosure are incorporate by reference as a part of the description of this disclosure.

This disclosure is not limited to the examples described above and is allowed to be changed, if desired, without departing from the essence or spirit of this disclosure which can be read from the claims and the entire specification. An information processing apparatus, an information processing method, a computer program and a recording medium with such changes are also intended to be within the technical scope of this disclosure.

DESCRIPTION OF REFERENCE CODES

1 Camera
3 Information processing apparatus
31 Arithmetic apparatus
311 Image acquisition unit
312 Luminance correction unit
313 Spoofing determination unit
4 Communication network
SYS information processing system
IMG Person image
IMG_base Base image
IMG_target Correction target image
IMG_mod Corrected image

What is claimed is:

1. An information processing apparatus comprising:

at least one memory configured to store instructions; and at least one processor configured to execute the instructions to:

obtain a plurality of person images which are generated by imaging a target by using a plurality of different lighting conditions, respectively;

perform a correction process of correcting a luminance value of each of the plurality of person images, by using a first index value indicating a mean of a luminance value of a base image included in the plurality of person images, and a second index value indicating a degree of variation in the luminance value of the base image;

generate, based on the corrected luminance value of at least one of the plurality of person images other than the base image, a corrected image; and determine, based on the corrected image, whether or not the target pretends to be another person.

2. The information processing apparatus according to claim 1, wherein the correction process includes a process of:

performing a calculation of subtracting the mean of the luminance value of a first person image of the plurality of person images from the luminance value of the first person image; and adding the first index value to the calculation.

3. The information processing apparatus according to claim 2, wherein the correction process, for each of the plurality of person images, includes a process of:

(i) performing a first calculation of subtracting the mean of the luminance value of the first person image of the plurality of person images, from the luminance value of the first person image;

(ii) performing a second calculation of dividing a result of the first calculation by a third index value indicating a degree of variation in the luminance value of the first person image and multiplying a result thereof by the second index value; and (iii) performing a third calculation of adding the first index value to a result of the second calculation.

4. The information processing apparatus according to claim 3, wherein the first index value indicates the mean of a luminance value of one person image of the plurality of person images, the second index value indicates the degree of variation in the luminance value of the one person image.

5. The information processing apparatus according to claim 3, wherein the first index value indicates the mean of the luminance values of each of the plurality of person images, the second index value indicates the degree of variation in the luminance values of each of the plurality of person images.

6. An information processing method comprising:

obtaining a plurality of person images which are generated by imaging a target by using a plurality of different lighting conditions, respectively;

performing a correction process of correcting a luminance value of each of the plurality of person images, by using a first index value indicating a mean of a luminance value of a base image included in the plurality of person images, and a second index value indicating a degree of variation in the luminance value of the base image;

generating, based on the corrected luminance value of at least one of the plurality of person images other than the base image, a corrected image; and determining, based on the corrected image, whether or not the target pretends to be another person.

7. A non-transitory recording medium on which a computer program that allows a computer to execute an information processing method is recorded, the information processing method including:

obtaining a plurality of person images which are generated by imaging a target by using a plurality of different lighting conditions, respectively;

performing a correction process of correcting a luminance value of each of the plurality of person images, by using a first index value indicating a mean of a luminance value of a base image included in the plurality of person images, and a second index value indicating a degree of variation in the luminance value of the base image;

generating, based on the corrected luminance value of at least one of the plurality of person images other than the base image, a corrected image; and determining, based on the corrected image, whether or not the target pretends to be another person.

* * * * *